US008208212B2

United States Patent
Sato (10) Patent No.: US 8,208,212 B2
(45) Date of Patent: Jun. 26, 2012

(54) METHOD OF MAGNETIC TRANSFER AND A MAGNETIC RECORDING MEDIUM

(75) Inventor: Narumi Sato, Yamanashi (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 21 days.

(21) Appl. No.: 12/978,397

(22) Filed: Dec. 23, 2010

(65) Prior Publication Data

US 2011/0157735 A1 Jun. 30, 2011

(30) Foreign Application Priority Data

Dec. 25, 2009 (JP) .................... 2009-295311

(51) Int. Cl.
*G11B 5/86* (2006.01)

(52) U.S. Cl. ........................................................ 360/17

(58) Field of Classification Search .................... 360/17, 360/75
See application file for complete search history.

(56) References Cited

U.S. PATENT DOCUMENTS

| | | | | |
|---|---|---|---|---|
| 3,707,608 A * | 12/1972 | Sugaya et al. | ............ | 360/17 |
| 3,736,385 A * | 5/1973 | Waring, Jr. | ............ | 346/74.4 |
| 3,869,710 A * | 3/1975 | Harazono et al. | ............ | 360/17 |
| 5,487,926 A * | 1/1996 | Kuribayashi et al. | ............ | 428/33 |
| 6,304,407 B1 * | 10/2001 | Baker et al. | ............ | 360/75 |
| 7,026,029 B2 * | 4/2006 | Lindholm et al. | ............ | 428/64.1 |
| 7,602,566 B2 * | 10/2009 | Kuroda et al. | ............ | 360/17 |
| 2004/0150902 A1 | 8/2004 | Kamatani | | |
| 2006/0092536 A1 | 5/2006 | Hayashi | | |
| 2006/0194016 A1 * | 8/2006 | Lindholm et al. | ............ | 428/64.4 |

FOREIGN PATENT DOCUMENTS

| | | |
|---|---|---|
| JP | 11-025455 A | 1/1999 |
| JP | 2003-173657 A | 6/2003 |
| JP | 2004-234710 A | 8/2004 |
| JP | 2006-127684 A | 5/2006 |

\* cited by examiner

*Primary Examiner* — Fred Tzeng
(74) *Attorney, Agent, or Firm* — Rabin & Berdo, P.C.

(57) ABSTRACT

A method of magnetic transfer, including placing a first medium in contact with a second medium, pressing the first and second media together to form an adhered body, applying a magnetic field to the adhered body, and moving the magnetic field relatively to the adhered body, so as to transfer information from the first medium to the second medium. Then the monitoring of the adhered body is performed to detect existence of an air bubble between the first and second media.

9 Claims, 7 Drawing Sheets

METHOD OF MAGNETIC TRANSFER AND A MAGNETIC RECORDING MEDIUM

CROSS-REFERENCE TO RELATED APPLICATION

This application is based on, and claims foreign priority of, Japanese Patent Applications No. 2009-295311, filed on Dec. 25, 2009, the contents of which are incorporated herein by reference.

BACKGROUND OF THE INVENTION

1. Field of the Invention

The present invention relates to a method of magnetic transfer and a magnetic recording medium, in particular to a method of magnetic transfer to write a servo signal or a special data on a magnetic recording medium using a magnetic transfer technology, the servo signal performing positioning of a magnetic head that reads and writes data recorded on the magnetic recording medium in a hard disk drive (an HDD). The present invention also relates to a magnetic recording medium including transfer information written by the method of magnetic transfer.

2. Description of the Related Art

Nowadays, magnetic information is written into a magnetic recording medium in the following way. A magnetic recording medium without any magnetic information written therein is installed in an HDD device. Then, necessary information is written in the HDD on concentric regions called tracks having a certain width on the magnetic recording medium.

Read/write of data is conducted while a magnetic head is moving along the track. The magnetic head is controlled not to deviate from the track by detecting positional difference between the magnetic head and the track according to a magnetic signal called a servo signal recorded on the magnetic recording medium.

In order to write a servo signal precisely in a configuration of a concentric circle on a magnetic recording medium that has no recorded data, a device having precise position control function needs to be inserted in every HDD from the outside, and it takes several hours for writing several hundred thousands of tracks on one surface of a magnetic recording medium. Enhancement of recording density at present days demands higher precision in the position control device and longer time for writing operation. Thus, the circumstances have been great demerits in productivity and costs with HDDs.

Accordingly, technologies and devices have been developed in which a master disk for magnetic transfer having a servo signal pattern is made to adhere to (put in close contact with) a magnetic recording medium, and an external magnetic field is applied to the adhered body (a combined structure of the master disk and the medium) and the servo signal pattern is transferred to the magnetic recording medium in a moment. This method can reduce the manufacturing cost of a drive and enhance track density (by decreasing the track width).

However, if an effort is made to adhere the master disk and the magnetic recording medium to each other, both having smooth surfaces, by bringing them into close contact over whole surfaces thereof at once, the process adherence from the beginning to the end proceeds essentially at random sequence within the surfaces. Consequently, air may be confined between the transferring surface and the transferred surface depending on the sequence of contact, thus creating an "air bubble", which is a problem inhibiting sufficient contact between the transferring master disk and the transferred magnetic recording medium. Prescribed servo signal is not transferred in the air bubble, and a defect of "missing signal" is detected in the inspection on the magnetic recording medium after the transfer process.

To cope with this situation, Japanese Unexamined Patent Application Publication No. 2004-234710 discloses a method for uniform close contact with high precision between a transferring master disk and a transferred magnetic recording medium, in which the master disk and the medium are put in contact tightly in a pressurizing chamber or an evacuating chamber.

Japanese Unexamined Patent Application Publication No. H11-025455 discloses a method in which the transferring master disk is provided with grooves and holes for exhausting air, thereby making the master disk and the medium in tight contact by suction through the exhausting passage.

Japanese Unexamined Patent Application Publication No. 2003-173657 discloses a method of cleaning a master carrier in a process of transferring and recording a magnetic pattern corresponding to transfer information to a slave medium by making a master carrier carrying the transfer information and a slave medium receiving the transfer information in close contact and applying a magnetic field for magnetic transfer. In the method, the slave medium is subjected to verification inspection of the transferred magnetic pattern using a verification device. Based on the verification inspection, a part of the surface of the master carrier corresponding to the position of occurrence of the error is selectively cleaned to eliminate the deposited contaminant.

Japanese Unexamined Patent Application Publication No. 2006-127684 discloses an inspection method for detecting contamination on a master disk. In the method, a pair of master disks is pressed onto both surfaces of a magnetic disk to be transferred, and a magnetic field is applied to the pressed combination of the magnetic medium and the master disks to transfer the magnetic pattern on the surfaces of the master disks onto the both surfaces of the magnetic medium. After that, a light emission means emits light in such a way that the optical axis of the emission light takes an angle of 1 to 30 degrees with respect to a radial direction of an inspected part on the surface of the master disks and an imaging element of an imaging device takes images of the reflected light of the emitted light to inspect contamination.

However, in every prior art technologies with a master disk for magnetic transfer having a protruding contaminant adhered thereon, the contaminant inhibits tight contact and creates "an air bubble" around the contaminant. Unless eliminating the contaminant, the "missing signal" defects continue to be generated in the transferred media that are successively manufactured.

Occurrence of a defective contact due to the "air bubble" can only be detected by existence of the "missing signal" in the actually transferred medium. Consequently, great losses occur due to the time for inspecting every medium and defective media due to insufficient contact that are continuously produced during the inspecting period of time.

Although Japanese Unexamined Patent Application Publication No. 2006-127684 discloses an optical inspection method for a contaminant on the surface of a master disk after transferring the magnetic pattern thereon to a magnetic disk medium, the objects to be inspected are foreign matter of dusts and fibers adhered on the surface of the master disk and not an error of "missing signal" due to insufficient contact generated by an "air bubble".

SUMMARY OF THE INVENTION

In view of these circumstances, and in accordance with one aspect of the invention, a method of magnetic transfer is provided in which a transparent master disk for magnetic transfer is used, and an adhered body is formed consisting of the master disk and a magnetic disk medium to be transferred. At the time the adhered body is formed, the adhered body is monitored for checking existence of an "air bubble" between adhered surfaces through the transparent sheets of the master disks. If an air bubble is detected, a prompt is issued for cleaning the master disk. A magnetic recording medium may have a pattern formed by such a method of magnetic transfer.

Such a method of magnetic transfer according to the invention may be implemented by forming an adhered body composed of a master disk(s) for magnetic transfer having magnetic transfer information stored thereon and an article to which the transfer information is be transferred, by making the master disk(s) in close contact with the article and pressing the master disk(s) and the article together, and then magnetically transferring the transfer information from the master disk(s) for transfer to the article to be transferred by positioning a magnetic field-generating means to a vicinity of the adhered body and applying a magnetic field while relatively moving the magnetic field-generating means and the adhered body. According to an aspect of the invention, the master disk for transfer may be transparent to light, and existence of an "air bubble" that is possibly generated between adhered surfaces when forming the adhered body is monitored through the transparent master disk for transfer.

A magnetic recording medium according to the invention may include magnetic transfer information that is transferred by the above-described method of magnetic transfer.

According to still another aspect of the invention, a transparent master disk for transfer is used as described above, and inspection is carried out through the transparent sheets of the master disk for detecting an "air bubble" that may be generated between the surfaces of contact at the time of forming the adhered body with the article to be transferred. In addition, the method of the invention may store and compare positions of the "air bubble" generated in a plurality of adhered bodies to identify defective adhesion caused by protruding contamination on the master disk, and prompt cleaning of the master disk. Since judgment of defective adhesion is conducted right after the adhesion body is formed, the transferred article does not need to be inspected for an error of "missing signal" after the transfer process, and continued generation of products with defective adhesion is avoided as well.

DETAILED DESCRIPTION OF THE INVENTION

The following describes in detail an embodiment according to the present invention with reference to accompanying drawings.

Figure 1:
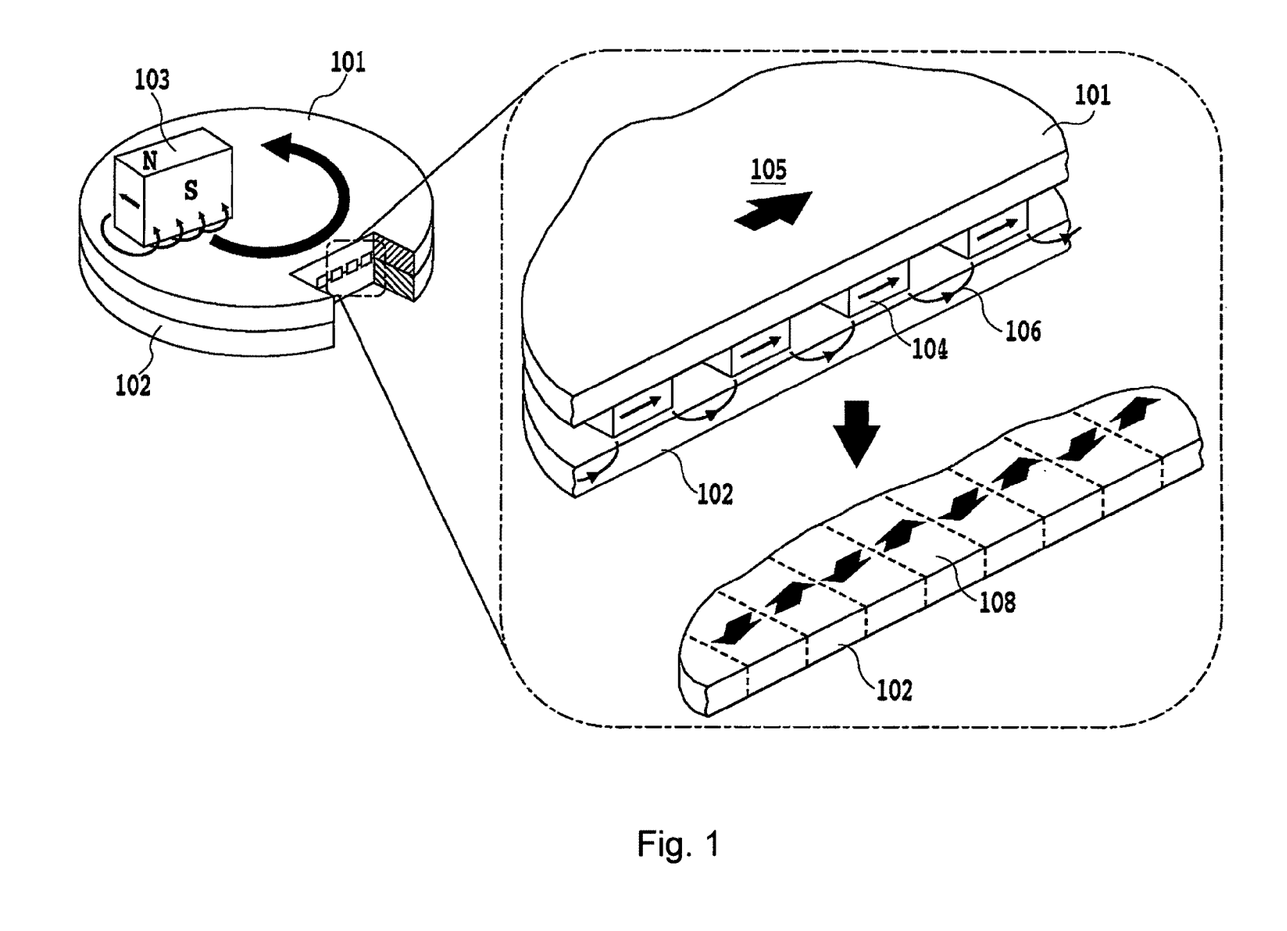
FIG. 1 shows schematically a principle of magnetic transfer of an edge transfer mode.

FIG. 1 shows schematically a principle of magnetic transfer of an edge transfer mode.

The surface of a master disk 101 for transfer to become in contact with an article 102 to be transferred is provided with a fine pattern of protrusions and recesses of a soft magnetic material corresponding to transfer information on a smooth substrate. In the master disk 101 for magnetic transfer to become in contact with the article 102 to be transferred, the region without the fine pattern of protrusions and recesses corresponding to the transfer information (the blank region in FIG. 7) has a surface roughness Ra of not larger than 1 nm. The smooth region without the fine pattern of protrusions and recesses preferably occupies at least 20% of the area of the surface of the master disk 101 for transfer, wherein the surface is the contacting surface with the article 102 to be transferred. If the surface roughness Ra is larger than 1 nm on the surface of the region of the master disk 101 for transfer without the fine pattern of protrusions and recesses, or the area of the smooth region is smaller than 20% of the area of the disk 101 for transfer to become in contact with the article 102 to be transferred, then an adhered body of the master disk(s) and the article cannot maintain an adhered state by itself.

The master disk 101 for transfer needs to be substantially flat. The clause 'a master disk 101 for transfer is flat' means that the master disk for transfer is not warped. A flatness of the master disk 101 for transfer is preferably at most 10 µm. If the flatness of the master disk 101 for transfer is larger than 10 µm, adhesion is hardly kept between the master disk for transfer and the article to be transferred. Here, the clause 'a flatness is at most 10 µm' means that no part of the master disk for transfer put on a horizontal plane rises from the horizontal plane by an amount larger than 10 µm.

When an article 102 to be transferred is put in contact with the master disk 101 for transfer and an external magnetic field 105 is applied to the adhered body of the master disk and the article, a leakage magnetic flux 106 penetrates into the article 102 to be transferred, thereby magnetizing a magnetic layer 108 of the article 102 to be transferred. Thus, a magnetic signal is transferred according to a pattern of the soft magnetic material of the master disk 101 for transfer. A surface roughness Ra of the article 102 to be transferred is at most 1 nm. If the surface roughness Ra of the article to be transferred is larger than 1 nm, the adhered body cannot keep an adhered state by itself.

In addition, a flatness of the article 102 to be transferred is preferably at most 10 µm. If the flatness of the article 102 to be transferred is larger than 10 µm, the adhered body cannot keep an adhered state by itself.

Figure 2:
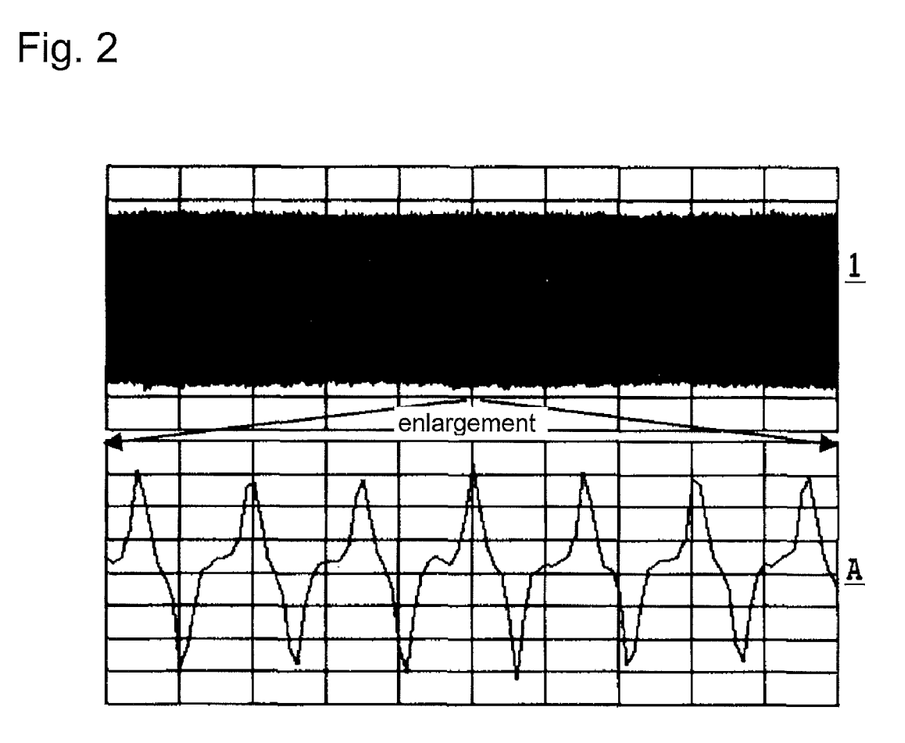
FIG. 2 shows an example of a transfer signal.

FIG. 2 shows an example of a magnetic signal. This mode of transfer is called an edge transfer mode since the transfer process is performed by the leakage magnetic flux from the edges of the protruding parts 104 of the pattern of soft magnetic material on the master disk 101 for transfer.

FIG. 1 shows magnetic transfer on the whole surface of one side at once by a magnet 103 rotating over the master disk 101. However, simultaneous transfer on the both surfaces of an article is possible. In that case, two master disks for transfer are put in close contact with the article to be transferred and two magnets are arranged opposing each other.

Figure 3:
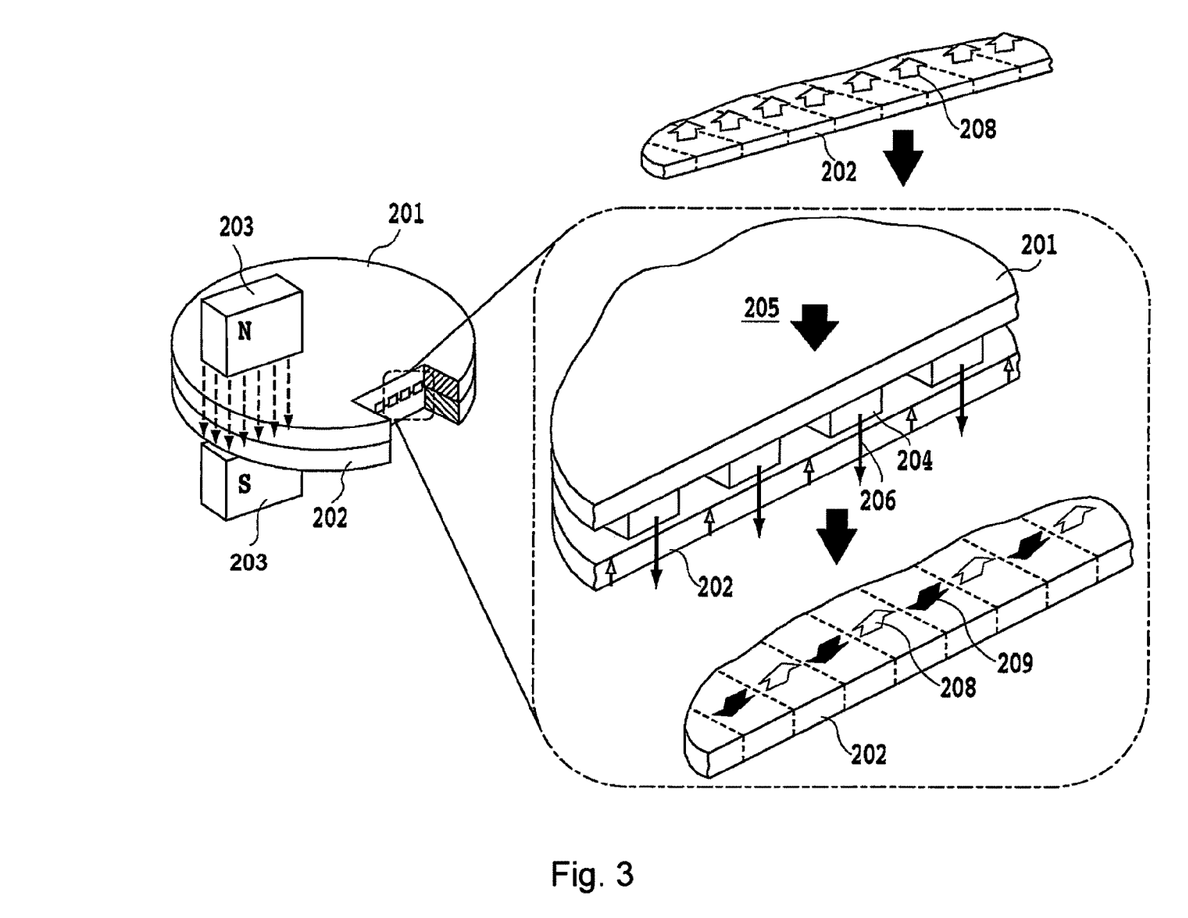
FIG. 3 shows schematically a principle of magnetic transfer of a bit transfer mode.

FIG. 3 illustrates another example of a principle of magnetic transfer. The article 202 to be transferred is magnetized in one direction prior to the transfer process. A magnetic field is applied in the direction vertical to the contact surface between the master disk 201 for transfer and the article 202 to be transferred in the transfer process. The article 202 to be transferred is magnetized in the direction indicated by the reference numeral 209 opposite to the direction indicated by the reference numeral 208 of the initial magnetization only at the places through which the magnetic flux 206 passes from the protruding parts 204 of the pattern of a soft magnetic material in the master disk 201 for transfer. This mode of transfer is called a bit transfer mode.

Figure 4:
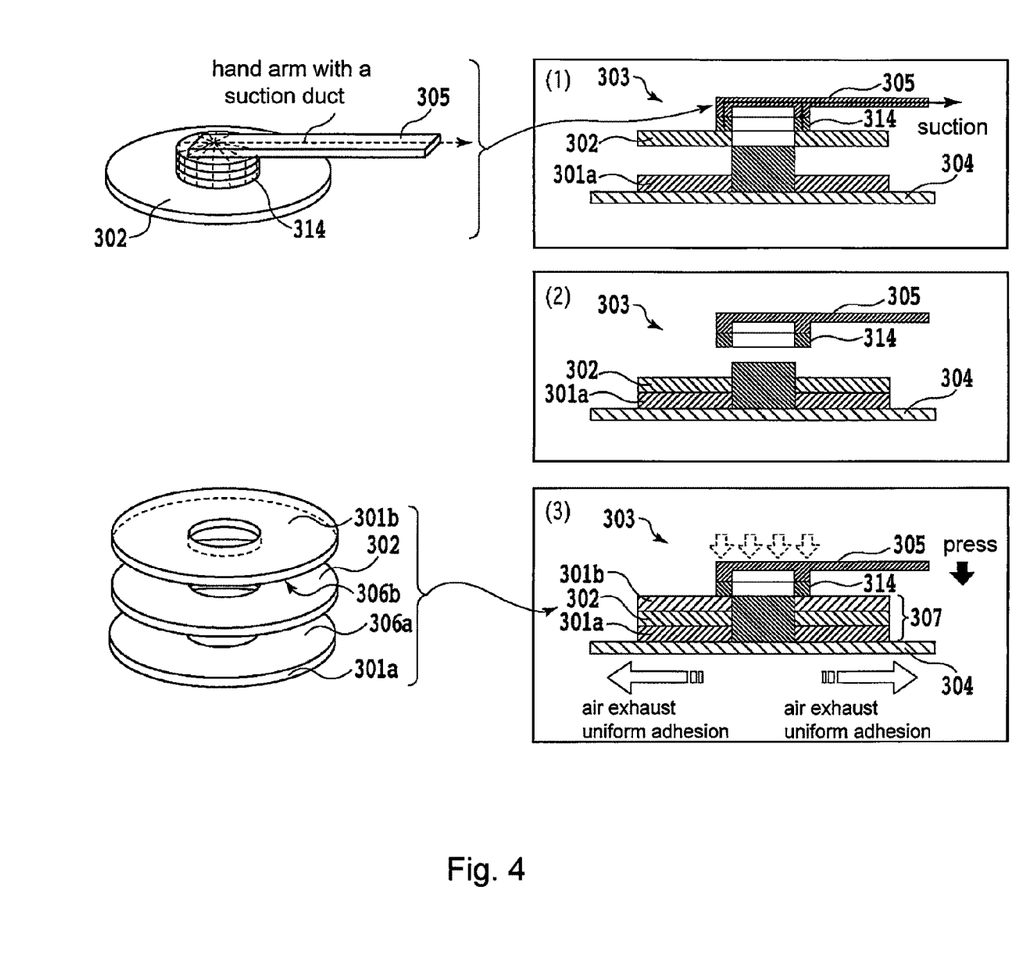
FIG. 4 shows an example of a step of forming an adhesion body according to the present invention.

FIG. 4 shows an example of a step of forming an adhered body according to the present invention, illustrating a process of adhering of the master disks 301a and 301b for transfer to an article 302 to be transferred. In the adhesion unit 303, a transport hand 305 successively transports the master disk 301a, the medium 302 that is an article to be transferred, and the master disk 301b by suction holding and stacks them on a stage 304. The surfaces 306a and 306b, each having a fine pattern of protrusions and recesses of soft magnetic material, of the master disks 301a and 301b face to the surfaces of the article 302 to be transferred. When the three disks are stacked, the transport hand 305 presses the inner circumferential region of the master disk 301b with a predetermined force. The pressure forces out the air contained between the master disk 301a and the medium 302 and the air between the master disk 301b and the medium 302 toward the outer circumference, thereby eliminating any air bubble and achieving uniform adhesion over the whole surfaces to form an adhered body 307.

The adhered body 307 formed in the step of forming an adhered body maintains the adhered state when once well adhered. Accordingly, it is convenient to prepare two magnetic transfer units for one adhesion unit 303. While the first magnetic transfer unit is executing magnetic transfer of the adhered body 307 formed in the adhesion unit 303, a new adhered body 307 is produced in the adhesion unit 303 and transported to the second magnetic transfer unit and a transfer process is executed there. When the transfer process is finished in the first magnetic transfer unit, the next adhered body 307 is supplied to the first magnetic transfer unit. Thus, magnetically transferred articles are successively manufactured without interruption.

Figure 5:
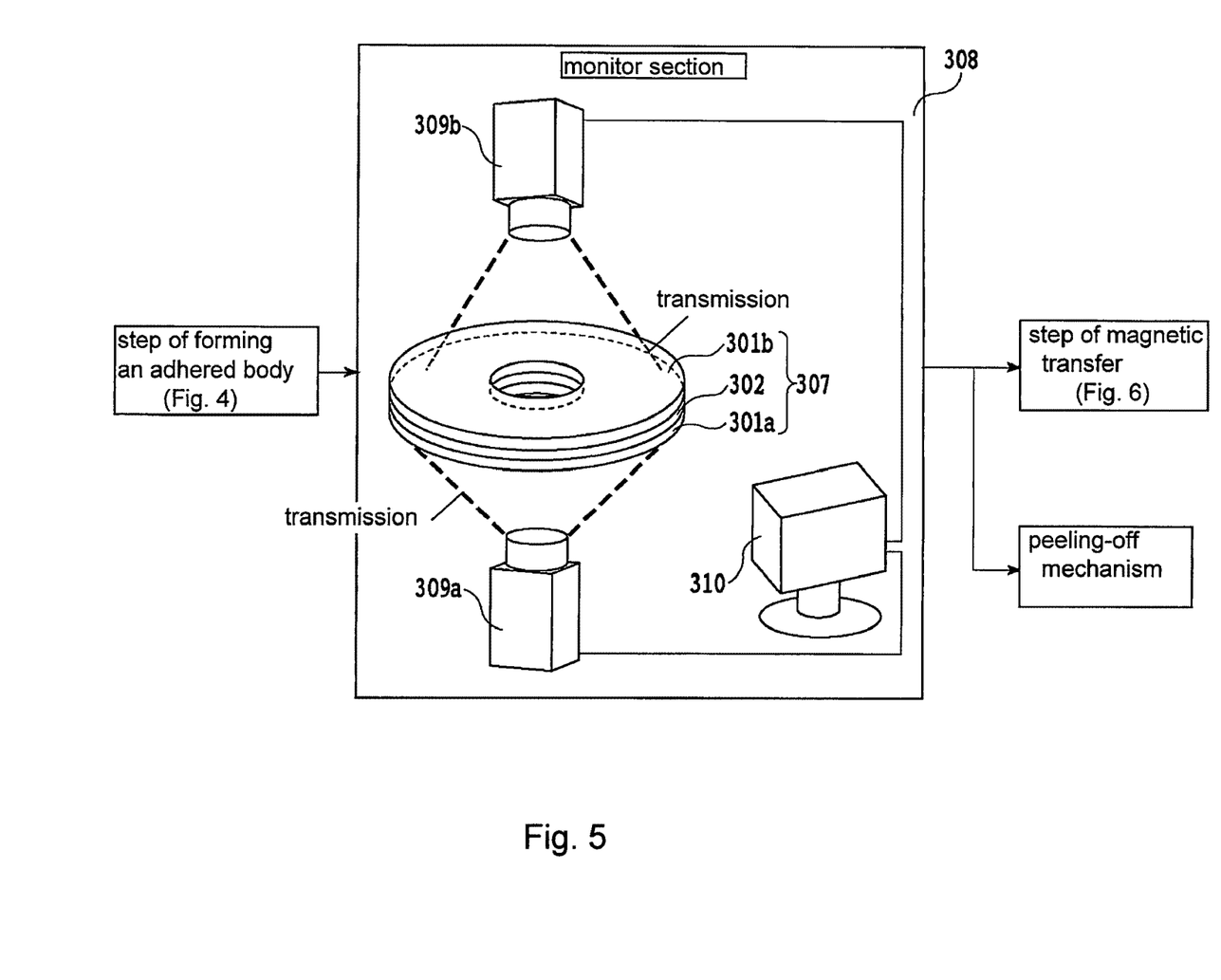
FIG. 5 shows schematically a monitoring section in the method of the present invention.

Next, monitoring of the air bubble is described with reference to FIG. 5.

The adhered body 307 formed in the process shown in FIG. 4 is transported to a monitor section 308 keeping the adhered state. Images of the master disks 301a and 301b are taken by CCD cameras 309a and 309b, respectively. A CPU analyzes whether any air bubble exists or not on the adhered surfaces, which can be seen through transparent master disks. At a place of an air bubble, a Newton ring, an optical interference fringe that can be observed yet by visual check, is generated. The inspection of an air bubble is performed by detecting the interference fringe. If an air bubble is detected, the transfer process is interrupted and the transferred article is peeled off from the master disks by a method not illustrated in the figures.

Then, a new adhered body 307 is formed with a new article 302 to be transferred and the same master disks 301a and 301b in the same procedure as the one described above. The new adhered body 307 is transported to the monitor section 308. Images of the surfaces of the master disks 301a and 301b are taken by the CCD cameras 309a and 309b and the existence of any air bubble is checked on the adhered surfaces, which can be seen through the transparent master disks.

If an air bubble is detected, the image including the detected air bubble is compared with the image formerly taken. If the air bubble is detected at the same position, that is, when an air bubble is detected at the same position in the adhered bodies comprising the same master disk at least two times in succession, it is considered that a protruding contaminant adheres to the adhered surface of the master disk, and an alarm is issued to prompt cleaning of the master disk. Transport of the adhered body 307 to the next step of magnetic transfer is stopped, and the procedure is brought to a halt.

Although two CCD cameras are used in this description of embodiment, the number of cameras and arrangement thereof are not limited to a special condition. For example, the images can be taken one surface by one surface using only one camera, turning the adhered body over by means of a certain devised transport mechanism.

Figure 6:
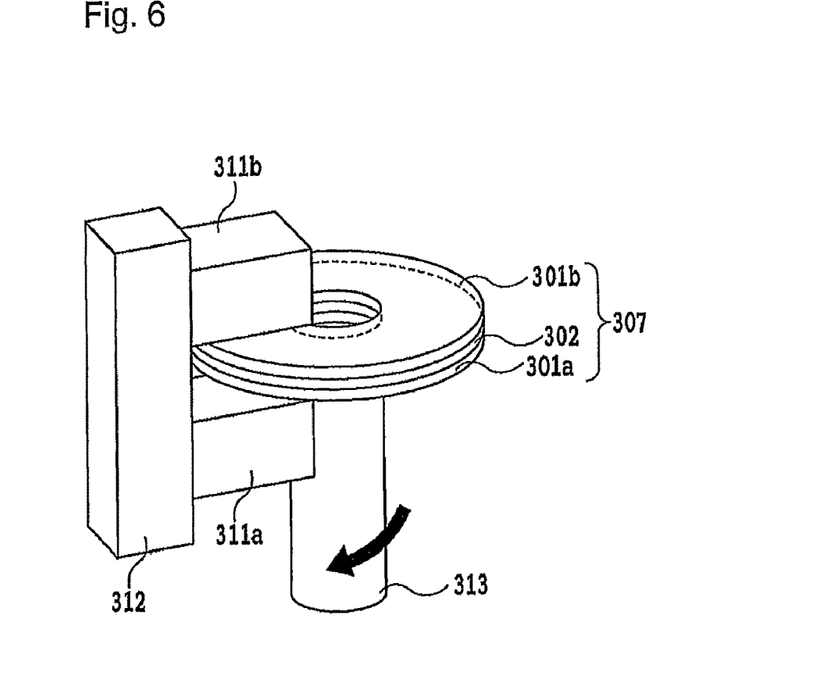
FIG. 6 illustrates an example of a step of magnetic transfer in the method of the present invention.

When an air bubble is detected by neither camera, the adhered body 307 is transported to a step of magnetic transfer as shown in FIG. 6. By operation of driving section 312 having magnets 311a and 311b, the magnets 311a and 311b approach the close vicinity of the adhered body 307. Turning the spindle 313, specified magnetic signals are transferred to the whole surface of the transferred article 302.

EXAMPLES

Example 1

A master disk for transfer was manufactured as follows. A soft magnetic layer of Fe50Co 40 nm thick, and a carbon protective layer 30 nm thick were deposited by a sputtering method on a transparent substrate of amorphous glass with an outer diameter of 65 mm and an inner diameter of 20 mm. After applying a resist material, a stamper of nickel was pressed against the resist surface, the nickel stamper having a fine pattern of protrusions and recesses corresponding to a prescribed pattern of a servo signal. As a result, a fine pattern of protrusions and recesses was duplicated on the resist surface.

After etching the resist film by a dry etching method, an ion milling process formed the fine pattern of protrusions and recesses on a soft magnetic layer. The resist and the carbon protective layer were eliminated by conducting a dry etching process again. Thus, a master disk 301 was completed. The height of steps between the formed protrusions and recesses was about 30 nm.

Figure 7:
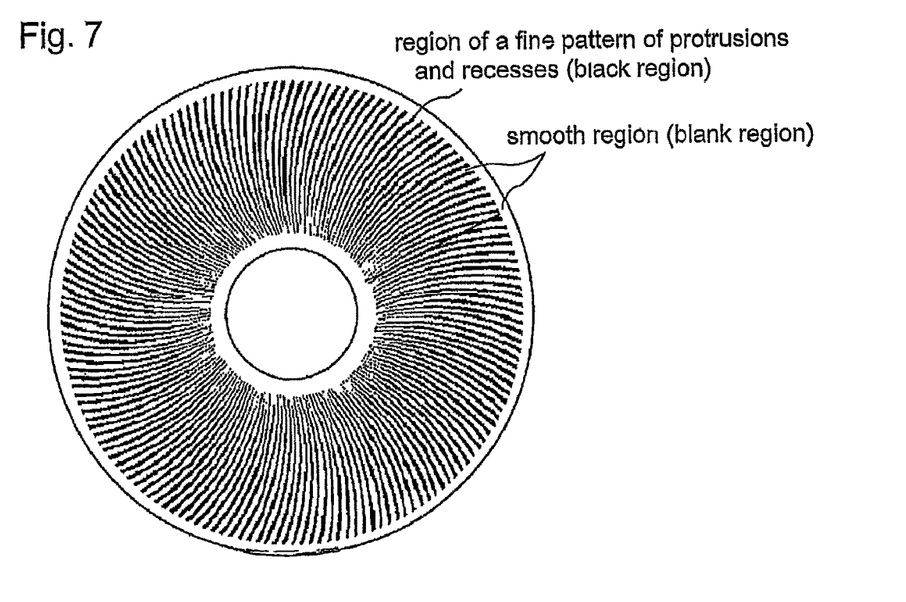
FIG. 7 shows schematically the places of forming a fine pattern of protrusions and recesses in a master disk for transfer.

The surface roughness Ra on regions except for the place of the fine pattern of protrusions and recesses was 0.45 to 0.5 nm. The flatness of the master disk 301 was 3.4 µm. FIG. 7 shows schematically the places of forming a fine pattern of protrusions and recesses in a master disk 301 for transfer. The black parts are areas of the formed pattern and occupied 19% of the surface area of the master disk, which means that the smooth region was 81%.

A magnetic recording medium was manufactured for an article 302 to be transferred by forming a magnetic layer and a protective layer on an amorphous glass substrate with an outer diameter of 65 mm and an inner diameter of 20 mm by a sputtering method, on which a lubricant material was further applied. The surface roughness Ra of the magnetic recording medium was 0.2 nm and the flatness was 3.2 µm.

The master disks 301a and 301b for transfer and the article 302 to be transferred, which was the magnetic recording medium described above, were transported by a transport hand 305 and stacked so that the surfaces 306a and 306b of the master disk 301 with a fine pattern of protrusions and recesses formed thereon opposed the surfaces of the article 302 to be transferred. Then, the master disk 301b was pressed against the article 302 by the transport hand 305 with a pressure of 6.5 kg/cm$^2$. When the resultant adhered body 307 was removed from the stage 304, the master disk 301 and the article 302 to be transferred had not yet become separated from each other. The transport hand held the master disk and the article to be transferred by suction, and the part of the transport hand to become in contact with the master disk or the article to be transferred was provided with a cylindrical elastic body 314 made of natural rubber having an outer diameter of 24.0 mm and an inner diameter of 20.0 mm.

Figure 8:
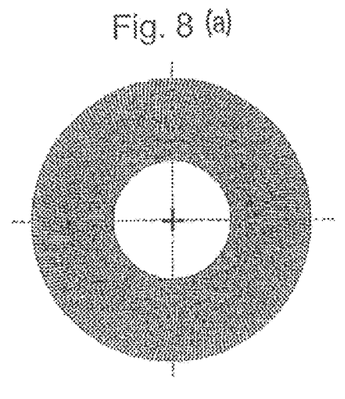
FIGS. 8(a) through 8(d) are examples of pictures of master disk surfaces taken by a CCD camera and analyzed by a CPU.

The adhered body 307 was transported to the monitor section 308 while maintaining the adhered state. Images of the surfaces of the master disks 301a and 301b were taken by the CCD cameras 309a and 309b. FIGS. 8(a) through 8(d) show examples of processed images, in which FIG. 8(a) is of the case without an air bubble and FIG. 8(b) is of the case with an air bubble. In the case including an air bubble, a pattern of concentric circles (Newton rings) was detected in the surface. In the embodiment examples, an air bubble was not detected until 12th adhesion process and a magnetic transfer process was conducted every time by a method described afterwards. On the obtained transferred articles 302, a magnetic signal was measured.

The adhered body 307 was put on the spindle 313 in the magnetic transfer device shown in FIG. 6 and held at the inner circumference of the adhered body. Then, the magnets 311a and 311b were moved to a position at a distance of 0.5 mm from the both surfaces of the adhered body 307 by operating the driving section 312. The spindle 313 was rotated two revolutions at a speed of 5 seconds per one revolution. Then, the magnets 311a and 311b were moved completely apart from the adhered body 307 by operating the driving section 312 and the adhered body 307 was taken out. The master disks 301a and 301b were released from the transferred article 302 by a peeling-off mechanism not illustrated in the figures. A magnetic signal in the transferred article 302 was reproduced using a magnetic head.

At the 13th adhesion process, an image as shown in FIG. 8(b) was obtained on the surface of the master disk 301b. Two air bubbles were generated in the surface. Accordingly, the adhered body 307 was not advanced to a step of magnetic transfer and divided into master disks 301a and 301b, and a transferred article 302, in the peeling-off mechanism not illustrated in the figures. The transferred article 302 was put away into a cassette for selected defective goods.

At the next 14th adhesion process, an image as shown in FIG. 8(c) was obtained on the surface of the master disk 301b. Comparing the images of FIG. 8(b) and FIG. 8(c) by the CPU 310, it was clarified that one air bubble was observed at the same position as indicated in FIG. (d). This means that a protruding contaminant adhered to the master disk 301b, and consequently, an alarm was issued by the CPU to halt the operation of the device.

Comparative Example 1

An adhered body 307 was formed comprising newly fabricated master disks 301a and 301b for transfer in the same procedure as in Example 1 and an article 302 to be transferred having the same structure as in Example 1. The adhered body 307 was transported directly to the magnetic transfer section, skipping transportation to the monitoring section 308. A step of magnetic transfer was performed in the magnetic transfer section. After that, the master disks 301a, 301b, and the transferred article 302 were separated from each other by a peeling-off mechanism not illustrated in the figures. A magnetic signal on the transferred article 302 was reproduced using a magnetic head. The above-described procedure of forming the adhered body and magnetic transfer was conducted in the same manner as in Example 1 except that a monitoring process was omitted in Comparative Example 1. The processes of the adhered body formation and the magnetic transfer were repeated 100 times.

Until 14th adhesion processes, no missing signal occurred. At the 15th process and thereafter, the missing signal occurred every time on the surface of the master disk 301b. As a consequence, transferred articles 302 containing a missing signal defect continued to be produced until 100th magnetic transfer process.

Results on the Example 1 and Comparative Example 1 are given in Table 1.

TABLE 1

|  | Number of adhesion process | Surface of master disk 301 *1) | Monitored air bubble | Missing signal |
|---|---|---|---|---|
| Example 1 | 1-12 | surface a | none every time | none every time |
|  |  | surface b | none every time | none every time |
|  | 13 | surface a | none detected | not evaluated because of |
|  | 14 | surface a | none detected | stop of transfer process |
|  |  | surface b | detected |  |
| Comp Ex 1 | 1-14 | surface a | monitoring skipped | none every time |
|  |  | surface b |  | none every time |
|  | 15-100 | surface a |  | none every time |
|  |  | surface b |  | detected every time |

*1) "surface a" is the surface, opposing the transferred article 302, of the master disk 301a, and "surface b" is the surface, opposing the transferred article 302, of the master disk 301b As shown in Table 1, when an air bubble was detected by the monitor section 308, the transfer process was interrupted, avoiding wasteful production of media containing a missing signal defect. In contrast, when the monitoring process by the monitoring section 308 was skipped, the missing signal defect continued to be generated in every transferred article 302.

What is claimed is:

1. A method of magnetic transfer, comprising:
   placing a first medium in contact with a second medium and pressing them together to form an adhered body;
   applying a magnetic field to the adhered body, and moving the magnetic field relatively to the adhered body, so as to transfer information from the first medium to the second medium; and
   monitoring the adhered body to detect existence of an air bubble between the first and second media, wherein
      the first medium is transparent to light, and
      said monitoring is performed through the transparent first medium.

2. The method of claim 1, wherein said monitoring is performed by a camera.

3. The method of claim 2, further comprising, upon detection of the existence of the air bubble,
   recording a first location of the air bubble;
   placing a third medium in contact with the first medium and pressing the first and third media together so that the first and third media are adhered to each other;

applying the magnetic field to the pressed first and third media, and moving the magnetic field relatively to the pressed first and third media;

monitoring the pressed first and third media to detect existence of a new air bubble therebetween; and upon detection of the existence of the new air bubble, recording a second location of the new air bubble, and if the first and second locations match, recording existence of an imperfection of the first medium.

4. The method of claim 3, wherein the third medium has a surface roughness of at most 1 nm and a flatness of at most 10 μm.

5. The method of claim 3, wherein the third medium has a surface roughness of at most 1 nm and a flatness of at most 10 μm.

6. The method of claim 1, further comprising, upon detection of the existence of the air bubble, recording a first location of the air bubble;

placing a third medium in contact with the first medium and pressing the first and third media together so that the first and third media are adhered to each other;

applying the magnetic field to the pressed first and third media, and moving the magnetic field relatively to the pressed first and third media;

monitoring the pressed first and third media to detect existence of a new air bubble therebetween; and upon detection of the existence of the new air bubble, recording a second location of the new air bubble, and if the first and second locations match, recording existence of an imperfection of the first medium.

7. The method of claim 1, wherein the first medium includes protrusions and recesses, corresponding to the information, formed on a smooth and flat surface.

8. The method of claim 7, wherein a portion of the surface of the first medium on which the protrusions and recesses are not formed has a surface roughness of at most 1 nm and a flatness of at most 10 μm; and the area of said portion includes at least 20% of an entire area of contact between the first and second media.

9. The method of claim 1, wherein the second medium has a surface roughness of at most 1 nm and a flatness of at most 10 μm.

* * * * *